(12) United States Patent
Zhang (10) Patent No.: US 10,986,318 B2
(45) Date of Patent: Apr. 20, 2021

(54) ELECTRONIC APPARATUS (71) Applicant: ZTE CORPORATION, Guangdong (CN)

(72) Inventor: Yongliang Zhang, Guangdong (CN)

(73) Assignee: ZTE Corporation, Guangdong (CN)

( * ) Notice: Subject to any disclaimer, the term of this patent is extended or adjusted under 35 U.S.C. 154(b) by 238 days.

(21) Appl. No.: 16/309,334

(22) PCT Filed: Sep. 18, 2016

(86) PCT No.: PCT/CN2016/099241
§ 371 (c)(1),
(2) Date: Dec. 12, 2018

(87) PCT Pub. No.: WO2017/215139
PCT Pub. Date: Dec. 21, 2017

(65) Prior Publication Data
US 2020/0314398 A1 Oct. 1, 2020

(30) Foreign Application Priority Data
Jun. 13, 2016 (CN) .......................... 201610414092.7

(51) Int. Cl.
G06F 13/00 (2006.01)
H04N 9/31 (2006.01)
H02J 7/00 (2006.01)

(52) U.S. Cl.
CPC ........... *H04N 9/3179* (2013.01); *H02J 7/007* (2013.01); *H04N 9/3141* (2013.01)

(58) Field of Classification Search
CPC .................................................. H04N 9/3179
See application file for complete search history.

(56) References Cited

U.S. PATENT DOCUMENTS 9,836,085 B2 12/2017 Peng et al.
10,136,094 B2 11/2018 Kasahara et al.
(Continued)

FOREIGN PATENT DOCUMENTS

CN 101414753 A 4/2009
CN 102624044 A 8/2012
(Continued)

OTHER PUBLICATIONS

First Office Action dated Jan. 21, 2020, for corresponding Japanese application 2018-564308.
(Continued)

*Primary Examiner* — Henry Tsai
*Assistant Examiner* — Dean Phan (57) ABSTRACT

An electronic apparatus, comprising: data and charging port, direct current charging port, data interface, power switch, charging management module, main processor, video receiver, and video processing module. The power switch detects whether data and charging port or direct current charging port is transferring electrical energy, and enables, according to detection result, conduction between the data and charging port or the direct current charging port and the charging management module. The charging management module employs, after becoming in conduction with the data and charging port or the direct current charging port, the data and charging port or the direct current charging port to charge battery. The main processor controls the video receiver to detect whether the data and charging port or the data interface is transmitting video data, and receives, according to detection result, one video data flow and sends the same to the video processing module for processing.

7 Claims, 7 Drawing Sheets

(56) References Cited

U.S. PATENT DOCUMENTS

| | | | | |
|---|---|---|---|---|
| 2007/0279603 A1* | 12/2007 | Akutsu | ............ | H04N 21/43632 353/122 |
| 2011/0113166 A1* | 5/2011 | Hung | .................... | G06F 13/426 710/63 |
| 2012/0098960 A1 | 4/2012 | Fujino et al. | | |
| 2012/0187897 A1 | 7/2012 | Lenk et al. | | |
| 2013/0300343 A1* | 11/2013 | Files | .................. | H02J 2207/40 320/103 |
| 2016/0050375 A1* | 2/2016 | Soffer | .................... | H04N 5/268 348/445 |
| 2016/0283175 A1* | 9/2016 | Nakahara | ............ | G06F 13/4286 |

FOREIGN PATENT DOCUMENTS

| | | |
|---|---|---|
| CN | 202872406 U | 4/2013 |
| CN | 103179367 A | 6/2013 |
| CN | 203193782 U | 9/2013 |
| CN | 203607899 U | 5/2014 |
| CN | 204539366 U | 8/2015 |
| JP | 2015-162853 A | 9/2015 |
| JP | 3203823 U | 3/2016 |
| TW | M514025 U | 12/2015 |
| WO | 2009028168 A1 | 3/2009 |
| WO | 2015183567 A1 | 12/2015 |

OTHER PUBLICATIONS

First Office Action dated Feb. 3, 2020, for corresponding Chinese application 201610414092.7.

Extended European Search Report dated Feb. 7, 2020, for corresponding European application 16905251.1.

International Search Report dated Feb. 22, 2017, for corresponding PCT application PCT/CN2016/099241.

* cited by examiner

ELECTRONIC APPARATUS

This is a National Phase Application filed under 35 U.S.C. 371 as a national stage of PCT/CN2016/099241, filed Sep. 18, 2016, an application claiming the benefit of Chinese Application No. 201610414092.7, filed Jun. 13, 2016, the content of each of which is hereby incorporated by reference in its entirety.

TECHNICAL FIELD

The present disclosure relates to the field of electronic technology, in particular, to an electronic apparatus.

BACKGROUND

Due to its high power consumption, an electronic apparatus with a built-in battery is generally equipped with a direct current (DC) charging port for charging which will not be multiplexed as a data interface of the electronic apparatus. For instance, a projector is equipped with a DC charging port and a USB Type A (USB-A) interface as a data interface. Generally, the USB-A interface has no sufficient charging capability to support the charging of the high capacity battery in the projector by heavy current.

With the popularization of the USB Type C (USB-C) interface, the charging function and the high-speed data transmission function can be concurrently achieved by a single USB-C interface, which basically meets the demand of an electronic apparatus with a built-in battery having a low power consumption and a low capacity. However, as for an electronic apparatus such as a projector which has a high-capacity built-in battery and a USB-C interface, it may still need a separate DC charging port since the long charging time may affect the use of the data transmission function of the USB-C interface by a user; moreover, because the USB-C charging port can be connected to a universal charger, the charging function of the USB-C interface is also retained simultaneously.

Meanwhile, in the event that charging with the DC charging port instead of the USB-C interface, and the USB-C interface is simply configured to transmit USB data, video data or audio data, all these data can be input only when there is an external USB-C to USB adapter connected thereto for converting the USB-C interface into a USB interface for video, audio or other data. It is inconvenient for a user to carry such an external adapter or it is likely to forget to take it along. In order that all these different data can be transmitted simultaneously, it is required that the electronic apparatus should have both the external physical interfaces and the internal data channels of its own extended: the external physical interfaces may be extended by adding a USB-C interface and a USB-A interface, and the internal data channels may be extended by extending the video, audio and USB data channels.

SUMMARY

In view of this, the embodiments of the present disclosure are intended to provide an electronic apparatus in which the charging ports thereon are automatically switchable to charge the electronic apparatus, and plural external data interfaces and internal data channels are extended such that various types of data can be transmitted thereby.

The technical solutions for settling the above technical issues employed in the embodiments of the present disclosure are as follows.

According to an embodiment of the present disclosure, provided is an electronic apparatus with a battery built therein, wherein the electronic apparatus includes: a data and charging port, a direct current charging port, a data interface, a power switch, a charging management module, a main processor, a video receiver, and a video processing module; the data and charging port is configured to transfer electric energy or transmit video data; the direct current charging port is configured to transfer electric energy; the data interface is configured to transmit video data; the power switch is configured to detect whether the data and charging port or the direct current charging port is transferring electric energy, and enable a conduction between the data and charging port or the direct current charging port and the charging management module according to a detection result; the charging management module, after it becomes in conduction with the data and charging port or the direct current charging port, employs the data and charging port or the direct current charging port to charge the battery; the main processor is configured to control the video receiver to detect whether the data and charging port or the data interface is transmitting video data, receive the video data from either of them according to a detection result, and send the received video data to the video processing module for processing.

Optionally, in the above electronic apparatus, the power switch includes a threshold detection circuit, an inverter, a comparator, and a switch transistor; the threshold detection circuit is configured to detect a potential of the data and charging port; the inverter is configured to acquire the potential of the data and charging port or a potential of the direct current charging port, and input a corresponding reverse potential; the comparator is configured to compare the reverse potential of the data and charging port and the potential of the direct current charging port, or compare the potential of the data and charging port and the reverse potential of the direct current charging port, and a potential of a comparison result controls the switch transistor to turn on or off; the switch transistor turning on or off causes a connection or disconnection between the data and charging port or the direct current charging port and the charging management module.

Optionally, in the above electronic apparatus, the data and charging port and the data interface are further configured to transmit interface protocol data; and the main processor is configured to process the interface protocol data transmitted by the data and charging port and by the data interface.

Optionally, the above electronic apparatus further includes: an interface controller, and a high-speed data crossbar switch array; the interface controller is configured to control the high-speed data crossbar switch array to perform a detection on the data and charging port; when it is detected that the data and charging port transmits the interface protocol data, it transmits the interface protocol data to the main processor; and when it is detected that the data and charging port transmits the video data, it transmits the video data to the video receiver.

Optionally, in the above electronic apparatus, the data and charging port acquires electric energy by a configuration channel signal pin, a power line is provided between the interface controller and the data and charging port, and the interface controller acquires the electric energy transferred by the configuration channel signal pin through the power line and transfers it to the charging management module.

Optionally, the above electronic apparatus further includes a first converter chip, and a second converter chip; the video receiver is configured to receive high-definition multimedia interface video; video data received by the data and charging port is video-interface video, and the first converter chip converts the video-interface video into the high-definition multimedia interface video and then transmits it to the video receiver; video data received by the data interface is mobile high-definition link video, and the second converter chip converts the mobile high-definition link video into the high-definition multimedia interface video and then transmits it to the video receiver.

Optionally, in the above electronic apparatus, there are more than one data interface.

Optionally, in the above electronic apparatus, the video processing module is an optical projection module.

According to the above technical solution, it can be seen that the electronic apparatus of the embodiment of the present disclosure has at least the following advantages.

The electronic apparatus according to the embodiment of the present disclosure has both a data and charging port and a DC charging port, and the data and charging port and the DC charging port are detected; when it is detected that at least one of the data and charging port and the DC charging port is transferring electrical energy, one of the ports which is transferring the electrical energy is selected to be in conduction with a charging management module so that the charging management module acquires the electrical energy and charges the battery; furthermore, the electronic apparatus according to the embodiment of the present disclosure detects the data transmitted by the data and charging port and/or the data interface so that the electronic apparatus acquires, as long as either of them performs video data transmission, the video data for processing regardless of whether the data and charging port is serving to charge.

The implementations, function features and advantages of the present disclosure will be further described in conjunction with the embodiments, with reference to the drawings.

DETAILED DESCRIPTION

In order to make the technical problems to be settled, the technical solutions and the benefits more clear, the present disclosure will be further described in detail below in conjunction with the embodiments and the drawings. It should be appreciated that the specific embodiments as described herein are only illustration, instead of limitation, of the present disclosure.

Figure 1:
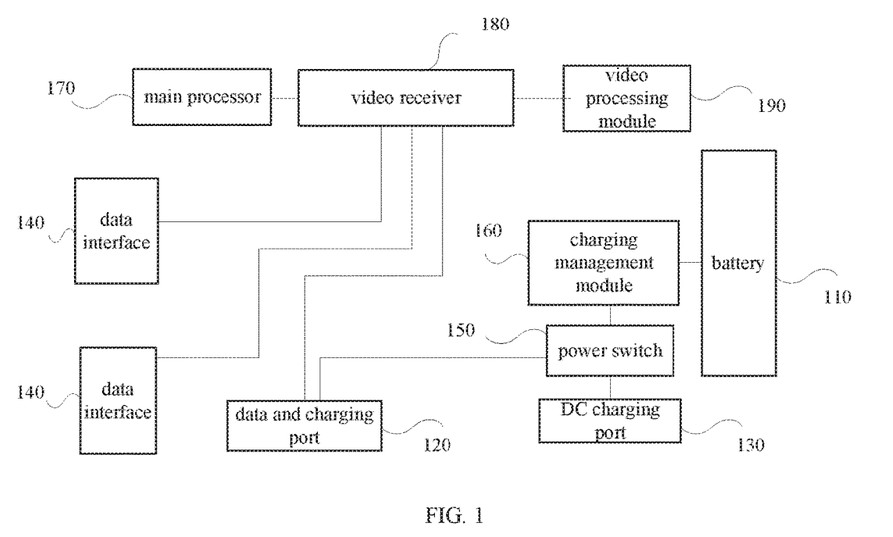
FIG. 1 is a structural diagram of an electronic apparatus of an embodiment of the present disclosure.

As shown in FIG. 1, an embodiment of the present disclosure provides an electronic apparatus with a battery 110 built therein. In the present embodiment, the type of the electronic apparatus is not limited; it may be a projector having a high power consumption, and the battery thereof may be a high-capacity built-in battery (typically, above 10000 mAh). The electronic apparatus includes: a data and charging port 120, a direct current (DC) charging port 130, a data interface 140, a power switch 150, a charging management module 160, a main processor 170, a video receiver 180, and a video processing module 190.

The data and charging port 120 is configured to transfer electric energy or transmit video data. The DC charging port 130 is configured to transfer the electric energy. The data interface 140 is configured to transmit the video data. The data and charging port 120 includes, but is not limited to, a USB-C interface, which can be connected with a USB data line, a display port (DP) video line, an audio line, or a 20V/5A universal power adapter. The DC charging port 120 can be connected with only a 20V/5A dedicated power adapter. The data interface 140 includes, but is not limited to, a USB-A interface.

The power switch 150 detects whether the data and charging port 120 or the DC charging port 130 is transferring the electric energy, and enable a conduction between the data and charging port 120 or the DC charging port 130 and the charging management module 160 according to a detection result. After becoming in conduction with the data and charging port 120 or the DC charging port 130, the charging management module 160 employs the data and charging port 120 or the DC charging port 130 to charge the battery 110.

In the present embodiment, in a case that both the data and charging port 120 and the DC charging port 130 are connected with a power adapter, the power switch 150 performs switching to conduct the power supplied from either of them to the charging management module 160 to charge the high-capacity built-in battery. In the present embodiment, both the USB-C interface and the DC charging port can perform charging. The charging can be achieved by connecting the USB-C interface with a universal 20V/5A power adapter having a USB-C terminal (20V/5A is the top configuration, and the configuration may be decreased to, such as 19V/3.5A as needed practically), and/or by connecting the DC charging port with a dedicated 20V/5A charger having a DC charging port terminal (generally, having a circle shape or other tailored shape). In a case that only one port is connected, a single-channel charging is achieved; in a case that both ports are connected, respectively, the built-in power switch 150 controls that only one channel of power supply for charging can be conducted to the charging management module 160 to power the system and to charge the high-capacity battery.

The USB-C interface has 24 pins in total, and supports double-side inserting; thus, the signal pins are present in pairs. There are 4 power pins and 4 ground pins, which may only support 5V/0.5A/1A/3A power supply and cannot meet the power requirement of the electronic apparatus with a high-capacity built-in battery. It is required a built-in USB-C detection & PD controller (i.e., the interface controller 610) to achieve a power supply capability up to 100 W; two configuration channel (CC) signals are used for configuring the master-slave direction and the interface direction; differential signal pairs at two Tx and two Rx are used for high-speed data (USB3.0/3.1 protocol data) transmission, in which one pair achieves a speed up to 5 Gbps, and thus the two pairs can achieve a speed up to 10 Gbps for transmitting high-speed data (high-definition video data and USB3.0/3.1 protocol data); two D+ pins and two D− pins are used for normal-speed data (USB2.0 protocol data) transmission; SBU1 and SBU2 pins are reserved pins which may be used for external audio.

According to the technical solution of the present embodiment, both the USB-C interface and the DC charging port are provided for charging in parallel; this is because the USB-C interface multiplexes multiple functions, while the long charging time makes it inconvenient for the user to use the data function frequently and connect a related device; in the case that the dedicated charging adapter with a DC charging port terminal is provided, a separate charging path is obtained; on the other hand, if the user forgets to carry the dedicated charging adapter, he or she may charge apparatus by using a universal charging adapter with a USB-C terminal. Switching between the USB-C interface and the DC charging port may be performed by the power switch without the controlling of the main processor.

The main processor 170 controls the video receiver 180 to detect whether the data and charging port 120 or the data interface 140 is transmitting the video data, receives the video data from either of them according to a detection result, and sends the received video data to the video processing module 190 for processing. In the present embodiment, the video receiver 180 may employ a high-definition multimedia interface (HDMI) multiplexing receiver.

In the present embodiment, in addition to the function of charging switching between the USB-C interface and the DC charging port, it is further provided a USB-A data function channel extended by USB HUB other than the USB-C data function channel. When the USB-C interface is serving to charge, numerous external devices such as an OTG external device, a traditional USB-A external device, etc., cannot be directly connected to the projector, which also brings inconvenience to the user. For instance, when the user intends to connect a USB mouse or keyboard to operate while the USB-C interface is being used as a DP to be connected to an external video and audio source to play video and audio, play a game or perform a video conference (via a USB camera) and the like, one USB-C interface is not enough. At this time, if it is further needed to connect a USB flash disk with a USB-A interface to transmit data, one USB-C interface is far from enough. In these application scenarios, the USB data path needs to be extended.

In the present embodiment, the video processing module 190 may be an optical projection module, and thus the electrical apparatus becomes a projector. With respect to signals required for the projection module to project, in the field of micro-projector, the Digital Light Processing (DLP) technology (in which the digital video display is implemented based on the digital micromirror device (DMD) developed by Texas Instruments Inc. (TI)) is mainly used; that is, RGB (three primary colors: red, green and blue) signals are used. The above video receiver 180 may use a multiplexing HDMI receiver to convert the HDMI signal of the USC-C interface into the RGB signal. In order to perform such conversion, the multiplexing HDMI receiver may have a built-in storage function to store high-bandwidth digital content protection (HDCP) and extended display identification data (EDID) transmitted from an external HDMI: the former ensures that encrypted high-definition video can be parsed, and the later contains parameters related to a monitor and performance thereof. An external device communicates or receives related information such as EDID and the like to/from the projector by the display data channel (DDC) of the HDMI.

The contents transmitted by the HDMI include the following:
1) video data;
2) audio data;
3) EDID information;
4) consumer electronics control (CEC) data (the consumer electronics control allows an end-user to use one remote controller to control plural HD devices supporting the CEC); it is needed for the MHL to transmit remote control protocol (RCP) data; and
5) clock information.

Since the HDMI carries the audio information as well, the converted contents output from the HDMI converter contains not only a video but also an Inter-IC Sound (I2S) audio signal, which is delivered to an audio codec and then outputs to a speaker. Thus, to be exactly, the HDMI video signal is an audio and video signal. However, for the sake of brevity, it is referred to as HDMI video signal in the descriptions of the present disclosure unless otherwise specified. In the present embodiment, the main processor 170 controls, by a serial command, the multiplexing HDMI receiver to switch to a single channel input from multiple channels of HDMI sources.

Furthermore, based on the related art, the USB-C interface may be directly connected to an audio signal source (the USB-A interface has no such a capability due to its limited signal line) as well; all audio signals for an external headphone with 3.5 mm plug can be achieved by connecting the SBU1/SBU2 respectively to a microphone and the ground (which can be identified by a system automatically although the definitions of the two signals are exact opposite in American Standard and in National Standard), the D+/D− respectively to left and right sound channel signals, the cc1/cc2 respectively to a headphone identification signal and a power source (one cc transmits signals while the other cc supplies power (i.e., Vconn) when there is a chip in the line), in particular, the digital audio signals can be directly input to a headphone so as to give the user a clearer and more fidelity hearing experience. Based on this related art, it can be extended to connect other external audio devices: audio signals of the USB-C interface interact with the audio codec controlled by the main processor 170 so that the external audio devices can operate and audio data can be transmitted between the USB-C interface and other audio devices.

Figure 2:
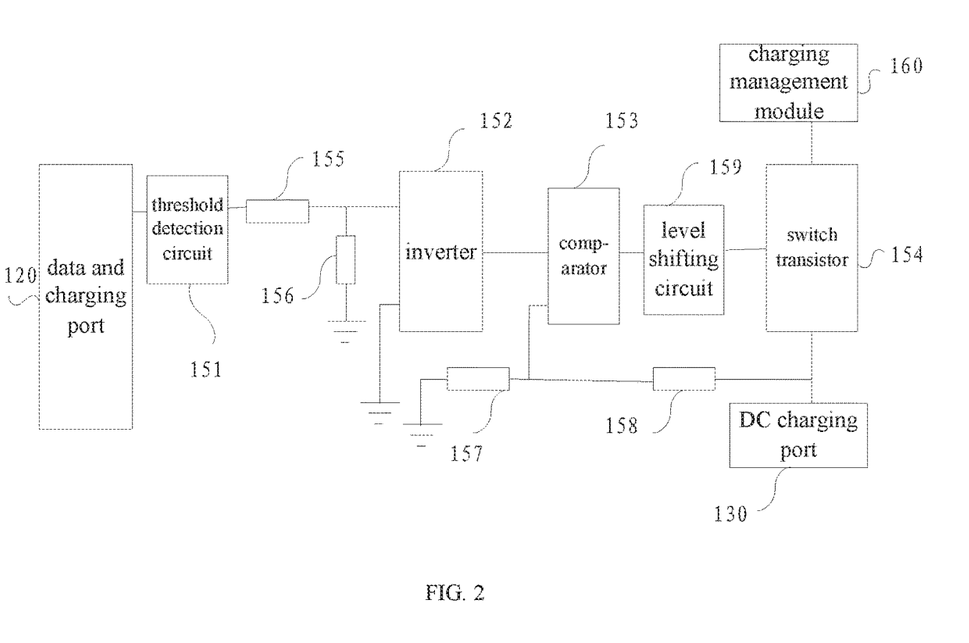
FIG. 2 is a structural diagram of a power switch in an electronic apparatus of an embodiment of the present disclosure.
Figure 3:
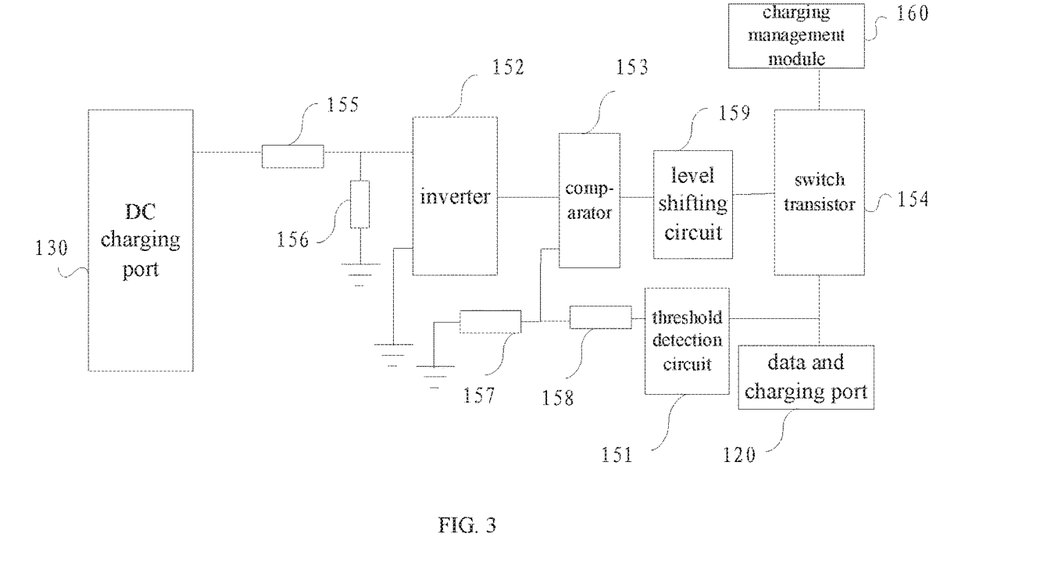
FIG. 3 is a structural diagram of a power switch in an electronic apparatus of an embodiment of the present disclosure.

As shown in FIGS. 2 and 3, an embodiment of the present disclosure provides an electronic apparatus, in which the power switch 150 includes a threshold detection circuit 151, an inverter 152, a comparator 153, and a switch transistor 154.

The threshold detection circuit 151 detects a potential of the data and charging port 120.

The inverter 152 acquires the potential of the data and charging port 120 or a potential of the direct current charging port 130, and inputs a corresponding reverse potential.

The comparator 153 compares the reverse potential of the data and charging port 120 and the potential of the direct current charging port 130 (as shown in FIG. 2), or compares the potential of the data and charging port 120 and the reverse potential of the direct current charging port 130 (as shown in FIG. 3), and a potential of the comparison result controls the switch transistor 154 to turn on or off.

The switch transistor 154 turning on or off causes a connection or disconnection between the data and charging port 120 or the direct current charging port 130 and the charging management module 160. In the present embodiment, the switch transistor 154 may be an NMOS transistor, or may be a PMOS transistor, as long as the comparator 153 is changed from an OR gate to an AND gate.

In the present embodiment, two working modes are provided: in the first working mode, as shown in FIG. 2, a power switch of power MOS transistor (MOSFET) connected between the DC charging port and the charging management module 160 is controlled by detecting the power supply potential of the USB-C interface (the data and charging port); in the second working mode, as shown in FIG. 3, a power switch of power MOS transistor (MOSFET) connected between the USB-C interface and the charging management module 160 is controlled by detecting the power supply potential of the DC charging port. The following description is made by taking FIG. 2 as an example.

The threshold detection circuit 151 detect an effective potential of the voltage at the USB-C interface, which is then divided by a voltage divider consisting of a matching resistor 155 and a matching resistor 156; and thus a potential suitable for the inverter 152 (which may be also regarded as an inverting comparator) is generated and is de-jittered by the inverter 152 to become a stable reverse potential which is then compared, by the AND gate (the comparator), with a potential obtained by dividing the voltage from the DC charging port using a voltage divider consisting of a matching resistor 157 and a matching resistor 158, and becomes thereafter an effective control level of a MOS switch transistor through a level shifting circuit 159 (generally, a triode). In this way, the MOS switch transistor between the DC charging port and the charging management module can be controlled to on or off. The example of FIG. 3 differs from that of FIG. 2 mainly in that, the on or off of the MOS switch transistor between the USB-C interface and the charging management module 140 is controlled by a detection based on a positive electrode Vin+ (a positive voltage) of the DC charging port. The DC charging port does not need a threshold detection due to its fixed voltage. The USB-C interface needs a threshold voltage detection because the voltage at the USB-C interface has a delay and may reach 20V after the power delivery (PD) protocol communication is performed; generally, this threshold voltage is set to be greater than 18V. The power supply for the threshold detection circuit, the inverter, the AND gate and the level shifting circuit is provided by a power supply management module.

Figure 4:
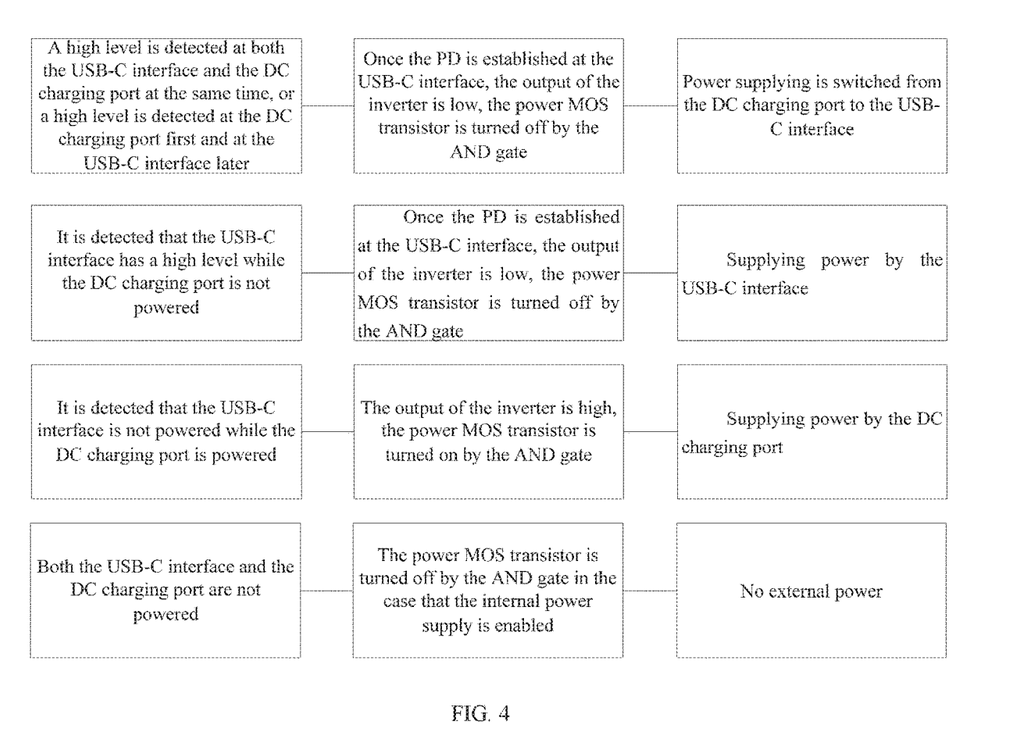
FIG. 4 is a working principle diagram of an electronic apparatus of an embodiment of the present disclosure.
Figure 5:
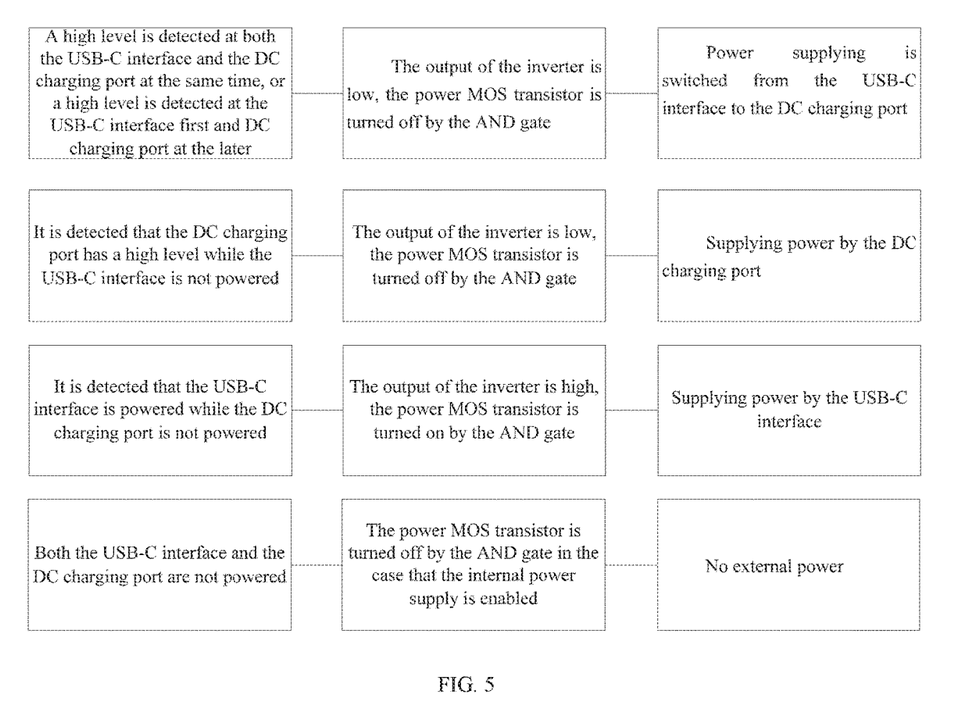
FIG. 5 is a working principle diagram of an electronic apparatus of an embodiment of the present disclosure.

In FIGS. 2 and 3, charging through the USB-C interface or the DC charging port has a higher priority, respectively. The working process of FIG. 2 under the priority mechanism is as shown in FIG. 4; the working process of FIG. 3 under the priority mechanism is as shown in FIG. 5. The processes in FIG. 4 and FIG. 5 differ only in directionality. The following description is made by taking FIG. 4 as an example.

In a case that the USB-C interface has a higher priority to charge, there are four situations:

1. A high level is detected at both the USB-C interface and the DC charging port at the same time, or a high level is detected at the DC charging port first and at the USB-C interface later: once the PD is established at the USB-C interface (a voltage greater than 18V is output), the output of the inverter is low, the power MOS transistor is turned off by the AND gate (a low level is obtained by performing the "AND" operation on the low level after the level of USB-C interface being inverted and the high level of the USB-C interface), and the power supplying part is switched from the DC charging port to the USB-C interface.

2. The USB-C interface has a high level while the DC charging port is not powered: once the PD is established at the USB-C interface, the output of the inverter is low, the power MOS transistor is turned off by the AND gate (a low level is obtained by performing the "AND" operation on the low level after the level of USB-C interface being inverted and the low level of the USB-C interface), and power is supplied by the USB-C interface.

3. The USB-C interface is not powered while the DC charging port is powered: the output of the inverter is high, the power MOS transistor is turned on by the AND gate (a high level is obtained by performing the "AND" operation on the high level after the level of USB-C interface being inverted and the high level of the DC charging port), and power is supplied by the DC charging port.

4. The internal power supply is enabled (the built-in battery is supplying power), and it is detected that both the USB-C interface and the DC charging port are not powered: the power MOSFET is turned off by the AND gate (a low level is obtained by performing the "AND" operation on the high level after the level of USB-C interface being inverted and the low level of the DC charging port), and the system has no external power.

There is also a special case, that is, the built-in battery has no power and both the USB-C interface and the DC charging port are not powered; in this case, the whole apparatus will not work, and no voltage detection is performed. The case shown in FIG. 5 in which the DC charging port has a higher priority to charge is similar to that of FIG. 4 in the power switching mechanism except that the detection on the DC charging port does not need the PD protocol establishing process, and does not need the threshold detection.

In the present embodiment, the working mechanism of switching between the USB-C interface and the DC charging port is accomplished by hardware circuits purely without logic judgment of internal software (a general purpose input and output interface whereby the power supply voltage detection circuit communicates with the system main processor) after the system startup, and thus may be faster in speed and energy-saving compared with the software switching mechanism.

Figure 6:
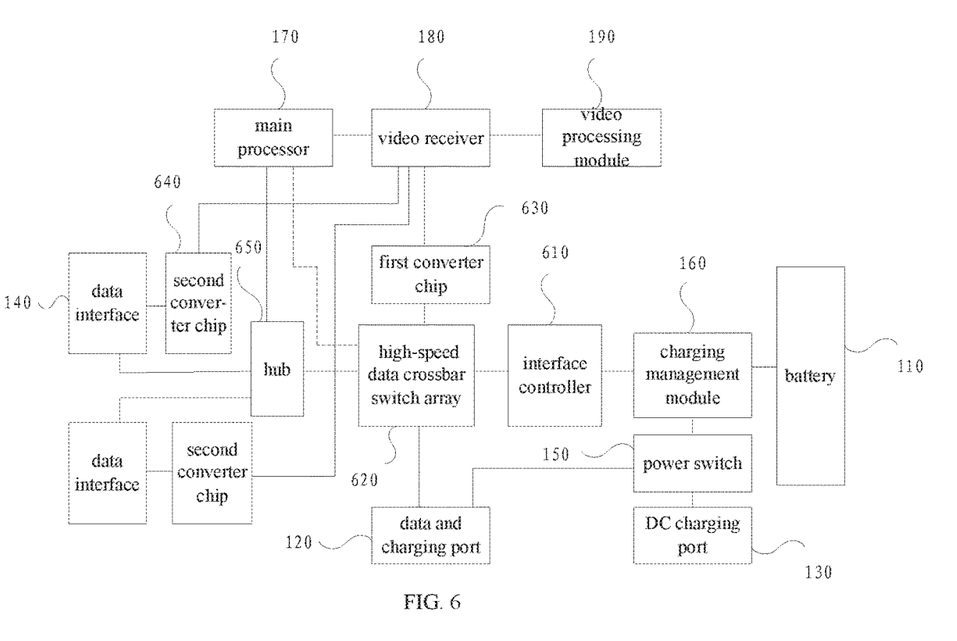
FIG. 6 is a structural diagram of an electronic apparatus of an embodiment of the present disclosure.

As shown in FIG. 6, an embodiment of the present disclosure provides an electronic apparatus in which the data and charging port 120 and the data interface 140 are further configured to transmit interface protocol data; the main processor 170 is configured to process the interface protocol data transmitted by the data and charging port 120 and the data interface 140. Specifically, the electronic apparatus further includes: an interface controller 610, a high-speed data crossbar switch array 620, a first converter chip 630, and a second converter chip 640.

The interface controller 610 controls the high-speed data crossbar switch array 620 to perform detection on the data and charging port 120; when it is detected that the data and charging port 120 transmits the interface protocol data, it transmits the interface protocol data to the main processor 170; and when it is detected that the data and charging port 120 transmits the video data, it transmits the video data to the video receiver 180.

The video receiver 180 is configured to receive high-definition multimedia interface video; the video data received by the data and charging port 110 is video-interface video, and the first converter chip 630 converts the video-interface video into the high-definition multimedia interface video and transmits it to the video receiver 180; the video data received by the data interface 140 is mobile high-definition link video, and the second converter chip 640 converts the mobile high-definition link video into the high-definition multimedia interface video and transmits it to the video receiver 180.

In the present embodiment and in this technical solution of the present embodiment, when the data and charging port employs a USB-C interface, the Tx and Rx of the USB-C interface are used for inputting a high-speed data signal. Such a high-speed data signal may be either USB3.0/3.1 protocol data or DP (DisplayPort, which can transmit both the video and the audio data) video data; these two types of data may be separated by the high-speed data crossbar switch array 620 controlled by the USB-C detection & PD controller (i.e., the interface controller). After being separated, the USB3.0/3.1 protocol data may be transmitted directly to the main processor (as indicated by the dotted line in FIG. 6); as described in a later embodiment, it may also be input along with the USB2.0 data (not shown in figures), which is transmitted by the USB-C detection & PD controller from the D+ and D− of the USB-C interface, via a compatible USB-A device extended by the built-in HUB (the hub 650), and therefore it is achieved that all the multiple USB channels including the USB-C and the USB-A are enabled to perform communicating. On the other hand, the DP video signal further arrives at the HDMI multiplexing receiver via the DP converter HDMI chip (the first converter chip), and the main processor controls the HDMI multiplexing receiver to receive this HDMI information and transmit the same to the optical module (in a projector, the optical module is the video processing module), achieving a projection.

Figure 7:
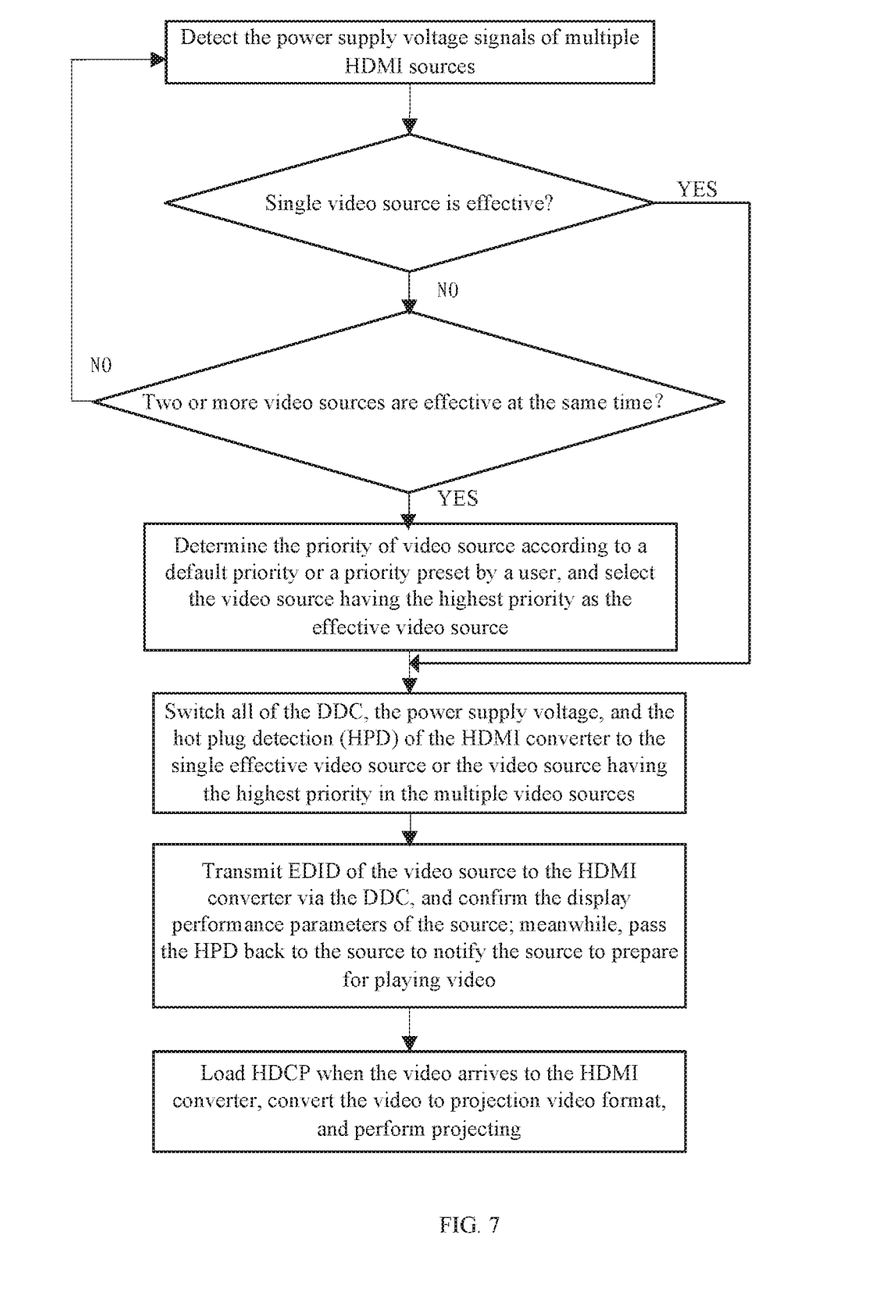
FIG. 7 is a workflow diagram of an electronic apparatus of an embodiment of the present disclosure.

In the present embodiment, the DP video data and the USB protocol data may be transmitted simultaneously by the high-speed data crossbar switch array set by the USB-C detection & PD controller (i.e., the interface controller). In the present embodiment, the USB HUB capable of transmitting the high-speed data and the normal-speed data simultaneously is placed between the multiple USB interfaces and the main processor so as to transmit, to the main processor simultaneously, the USB3.0/3.1 protocol data input from the USB-C interface and separated by the high-speed data crossbar switch array, the USB2.0 protocol data input from the USB-C and delivered by the USB-C detection & PD controller, and the USB2.0 or USB3.0/3.1 data input from multiple other USB-A interfaces. The two USB-A interfaces (as shown in FIG. 6) are capable of meeting the practical demand. Obviously, more USB-A interfaces may be provided (generally, one USB interface can be extended to four USB interfaces by the USB Hub), but the more interfaces may also make a USB device slower. In view of this, it is preferred to extend to two USB-A interfaces by the USB Hub in the preset embodiment. The extended two USB-A interface may be multiplexed to transmit mobile high-definition link (MHL) video signals at the same time, through two MHL-to-HDMI converter chip (i.e., the second converter chip), to the multiplexing HDMI receiver. In an electronic apparatus such as the projector, the main processor controls the multiplexing HDMI receiver to select one of the three video sources (one channel of HDMI data converted from DP data, and two channels of HDMI data converted from MHL data) and transmit the selected one to the optical module to perform projection. This is essentially a process of multi-video source switching; its basic flow is shown in FIG. 7.

At the first step, the power supply voltage signals of multiple HDMI sources are detected;

At the second step, it is determined whether a single video source is effective; if yes, then the process moves to the fifth step; otherwise, to the next step;

At the third step, it is determined whether two or more video sources are effective at the same time; if yes, the process moves to the next step; otherwise, to the first step to detect again;

At the fourth step, priority of each video source is determined according to a default priority or a priority preset by a user, and the video source having the highest priority is selected as the effective video source;

At the fifth step, DDC, the power supply voltage, and the hot plug detection (HPD) of the HDMI converter all are switched to the single effective video source or the video source having the highest priority in the multiple video sources;

At the sixth step, EDID of the video source is transmitted to the HDMI converter via the DDC, and the display performance parameters of the source are confirmed; meanwhile, the HPD is passed back to the video source to notify it to prepare for video playing;

At the seventh step, the video arrives to the HDMI converter and the HDCP is loaded, then the video is converted to the projection video format, and is projected for playing.

In the above process, it is not need to switch the CEC since the multiple channels of HDMI data are connected to a common CEC.

Switching of the playing of the MHL video differs from that of the HDMI video in that the HPD signal is not delivered back to the video source, and is delivered back by CBUS (the redefinition of the MHL on the signal line equivalent to USB ID; all the controlling signals of the HDMI, such as DDC, HPD, CEC, are transmitted through this pathway).

In the present embodiment, by extending multiple USB interfaces of different types and extending the internal video, audio or USB data channels, it is achieved that multiple channels of video, audio and USB data may be input simultaneously. In particular, the multiple channels of HDMI video sources converted from MHL and DP data based on different types of USB interfaces can be converted to optical projections.

Further, in the present embodiment, the data and charging port 120 acquires the electric energy by a configuration channel signal (CC) pin; a power line is provided between the interface controller 610 and the data and charging port 120, and the interface controller 610 acquires the electric energy transferred by the configuration channel signal pin through the power line and transfers it to the charging management module 160.

In the present embodiment, in a case that the data and charging port 120 is a USB-C interface, the power supply from the USB-C interface cannot reach the charging management module unless there is a built-in USB-C detection & PD controller. If there is no a built-in USB-C detection & PD controller, the USB-C interface is allowed to provide only 5V/0.5A/1A/3A power sources, which cannot meet the power requirement of the projector having a high-capacity built-in battery. The built-in USB-C detection & PD controller is able to achieve a power supply capability up to 100 W and support a fast charging; the PD is transmitted by the CC signal. As described in the foregoing embodiment, the power MOS transistor may be connected between the USB-C interface and the USB-C detection & PD controller.

Particularly, the power line between the USB-C detection & PD controller and the USB-C interface is bidirectional.

This controller enables the USB-C interface to further have an On-The-Go (OTG) function (which gets out of the limitation of the original master-slave architecture, and achieves the end-to-end data transmission between devices) and receive the information from a mouse, a keyboard and a mobile hard disk.

It can be seen from the embodiment as illustrated in FIG. 6 that, in the case of an electronic apparatus with a high power consumption such as a projector, the multiplexing of the charging function and the data transmission function is achieved without using extra accessories by multiplexing the multiple functions of the USB-C interface through the constructed circuits, providing switching function between the dedicated DC charging and USB-C charging, and providing multiple channels for audio and video and USB protocol data by additionally extending multiple USB-A channels as well; which brings convenience to the user. In the electronic apparatus of the embodiment of the present disclosure, both the USB-C interface and the DC charging port can be used for charging while it is ensured that the usages of the DP video data, the audio line, the USB data and the 20V/5A power source via the USB-C interface will not interfere with each other, and the USB-A interface is extended to make it compatible for both the USB data and the MHL video data. The USB-C interface can be connected with the USB data line, the DP video line, the audio line, and the 20V/5A universal power adapter; while the DC charging port can be connected with only the 20V/5A dedicated power adapter. If both of them are connected with power adapters simultaneously, a single power source is switched by the power switch to the charging management chip to charge the high-capacity built-in battery (typically, above 10000 mAh). The USB data signal and the DP video data of the USB-C interface is transmitted to the high-speed data crossbar switch array through a same pathway, while the power signal is transferred to the charging management chip via the USB-C detection & PD controller through another pathway. The USB-C detection & PD controller uses a control signal to control the high-speed data crossbar switch array to separate the USB data from the DP video data. The DP video data is transmitted, via the DP-to-HDMI converter chip, to the multiplexing HDMI receiver controlled by the main processor so as to be converted to the video mode for the optical module and to be projected. The USB data includes high-speed data and low-speed data, which can be transmitted directly to the main processor. However, the number of the USB ports allowed to be connected to the main processor is limited. In a case that it is required to make the external devices for the existing USB-A interface compatible, a USB HUB (hub) is added so as to extend it to two USB-A interfaces so that multiple channels of USB data from multiple USB ports can be input to the system main processor simultaneously (there is a single USB data channel at a side close to the main processor). Two USB-A interfaces may simultaneously transmit MHL video signals, which reach the multiplexing HDMI receiver via two MHL-to-HDMI converter chip, respectively. The main processor controls the multiplexing HDMI receiver by software to select one of the three video sources (one channel of HDMI data converted from DP data, and two channels of HDMI data converted from MHL data) and transmit the selected one to the optical module to perform projection. In the case that the electronic apparatus with a high-capacity built-in battery in the embodiment illustrated in FIG. 6 performs the high-speed data transmission and the high-current charging using the USB-C interface, the electronic apparatus is further configured with a DC charging port and a USB-A interface so that:

1. the charging function and the data function can be switched between the USB-C interface and the DC charging port and the USB-A interface which can substitute for each other to work, and supply the system power and provide an external video source to the video processing module of the electronic apparatus (e.g., the optical projection module of a projector);

2. the charging can be switched between the USB interface and the DC charging port, and a 20V/5A power supply can be provided and is controlled by the power switch to implement single-channel power supplying:

3. after the video data and the USB protocol data from the USB-C interface are separated, the USB protocol data extended by the USB Hub may be compatible with USB protocol data from multiple channels of USB-A interfaces, thus enabling simultaneously connecting with various types of external devices of USB3.0 and USB2.0 protocol;

4. the switching between the DP video signal from the USB-C interface and the MHL video signal from the USB-A interface is controlled by the system to use only one of them at a time;

5. other USB interface(s) (not limited to the USB-A type) may be extended in addition to the USB-C interface, and thus other general video and USB data functions may be performed by other USB interface(s) when the USB-C interface is occupied by an audio device, generally, by an external headphone.

Based on the above basic architecture with one USB-C interface and two USB-A interfaces which may be switchable between the projector power supply and the data functions, the present disclosure may be further extended. Such an extension is more meaningful in the case that the USB-C interface is able to transmit audio while the USB-A is unable to transmit audio.

Figure 8:
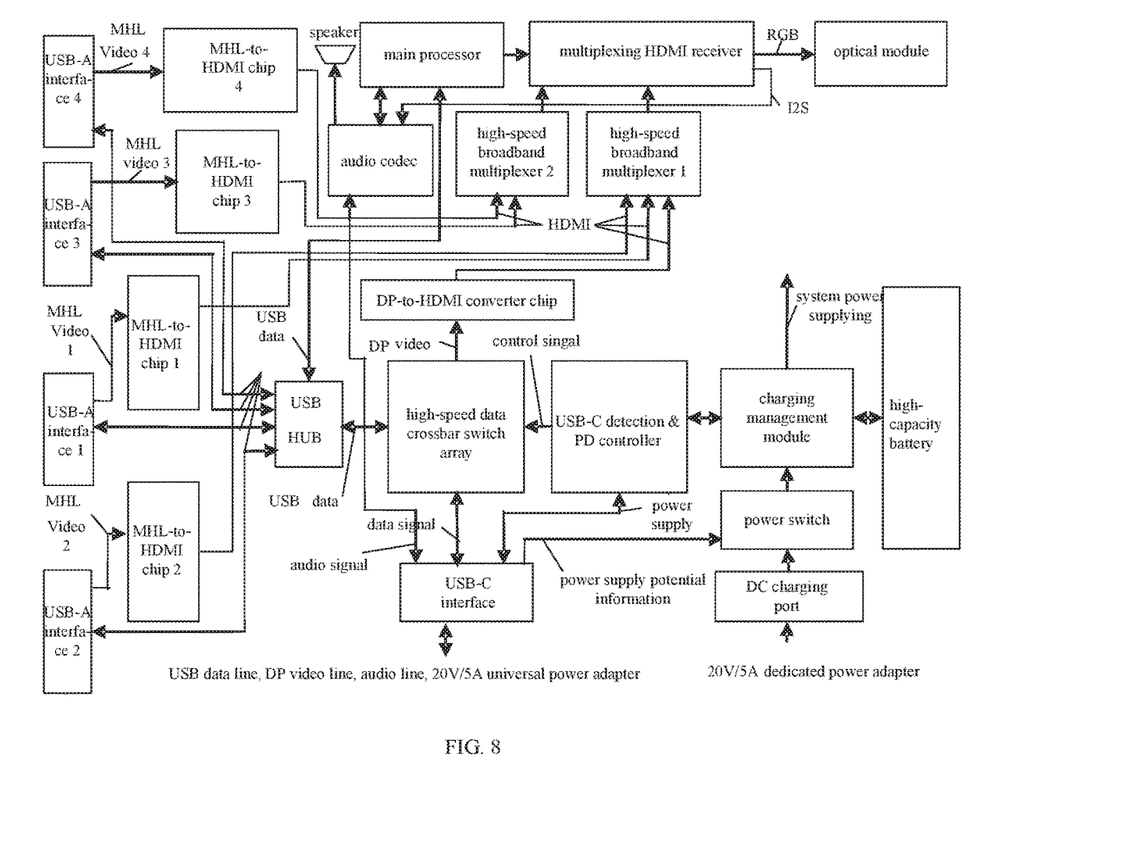
FIG. 8 is a structural diagram of an electronic apparatus of an embodiment of the present disclosure.

A simple extension is made on the basis of the example shown in FIG. 1, in which the USB HUB is extended within its full capabilities of 4 USB interfaces, that is, it is extended directly to 4 USB-A interfaces, as shown in FIG. 8. In this case, due to the limitation of the interface capability of the multiplexing HDMI receiver controlled by the main processor (the more the HDMI video signal lines, the greater the high-speed data signal interference; thus, a single receiver usually has no more than 3 input channels), two high-speed broadband multiplexer are added in the preceding stage of the HDMI receiver (because of the high difficulty of the video high-speed signal processing, a single switch also has no more than 3 input channels) so as to perform "one out of two" and "one out of three" operations on the HDMI signals converted from the MHL data of four USB-A interfaces and the HDMI signal converted from the DP data of one USB-C interface, respectively, in order to achieve simultaneously converting multiple channels of video for transmitting. Similar to the multiplexing HDMI receiver, the high-speed broadband multiplexer requires an internal storage function to store HDCP and EDID transmitted from an external HDMI in order to ensure that encrypted high-definition video can be parsed and parameters related to the monitor and the performance thereof can be acquired. The "one out of multiple" process of the high-speed broadband multiplexer and the video source switching process of the multiplexing HDMI receiver here may be performed according to the flow shown in FIG. 7.

Figure 9:
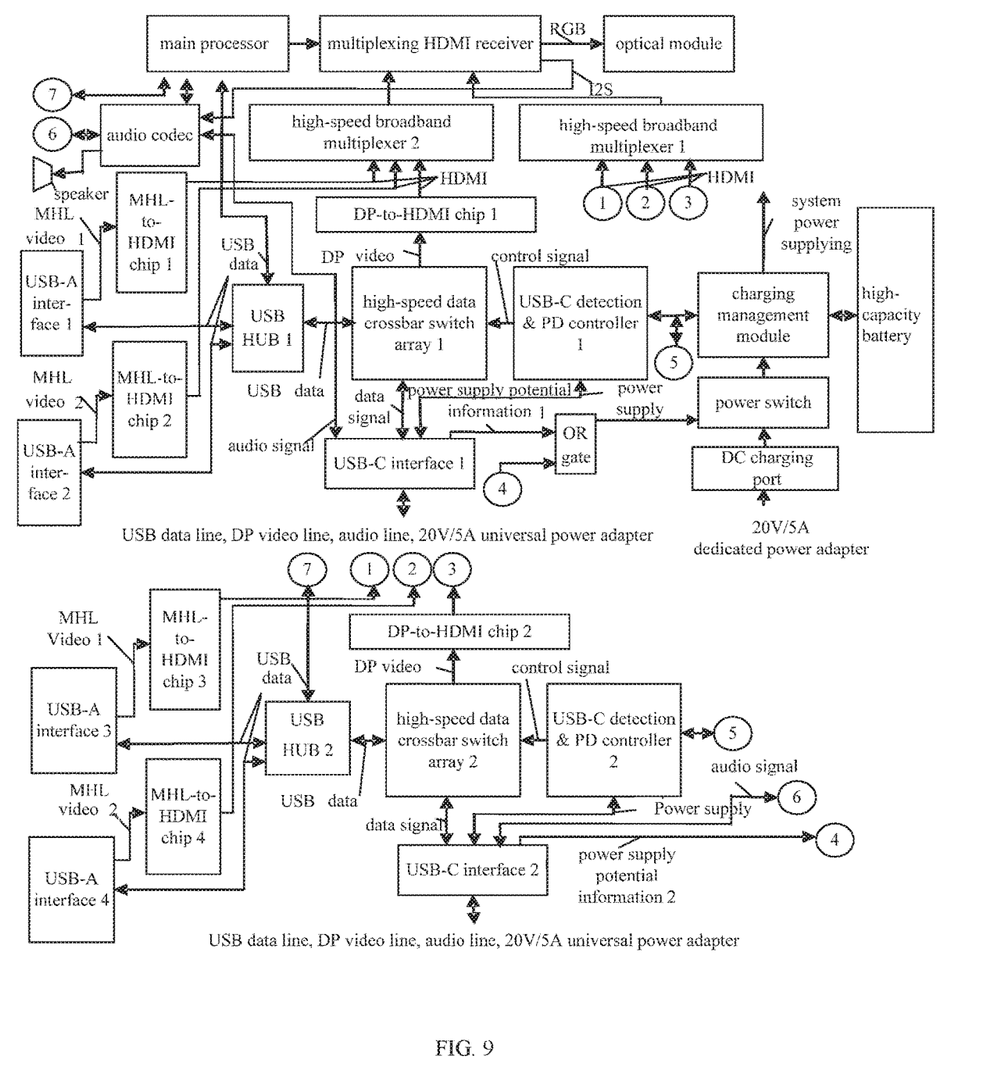
FIG. 9 is a structural diagram of an electronic apparatus of an embodiment of the present disclosure.

A more complex extension is to extend both the USB-C interface and the USB-A interface. As shown in FIG. 9, it illustrates an embodiment of switching between the power supply and data interfaces of two USB-C interfaces and four USB-A interfaces. This embodiment is substantially equivalent to an architecture obtained by putting two architectures shown in FIG. 1 together, except that the processor, the audio codec, the multiplexing HDMI converter and the optical module, and the charging module, the high-capacity battery, the power switch circuit and the DC charging port are commonly used.

The connections of the common terminals are achieved in a manner as indicated by the symbols ①, ②, ③, ④, ⑤, ⑥, ⑦ shown in the figure.

The symbols ①, ②, ③ indicate that the HDMI video source converted from the DP data of the USB-C 2 interface and the HDMI video sources converted respectively from the MHL data of the USB-A 3 and USB-A 4 interfaces are transmitted to the high-speed broadband multiplexer 1 so that one of the three channels of video will be selected; and then, the selected one channel of video, and another one channel of video (which is selected by the high-speed broadband multiplexer 2 from the following three sources: the HDMI video source converted from the DP data of the parallel USB-C 1 interface, and the HDMI video sources converted respectively from the MHL data of the USB-A 1 and USB-A 2 interfaces) are transmitted to the multiplexing HDMI receiver controlled by the main processor; the multiplexing HDMI receiver switches to a single video source and converts it to a video format receivable by the optical module for projecting.

Figure 10:
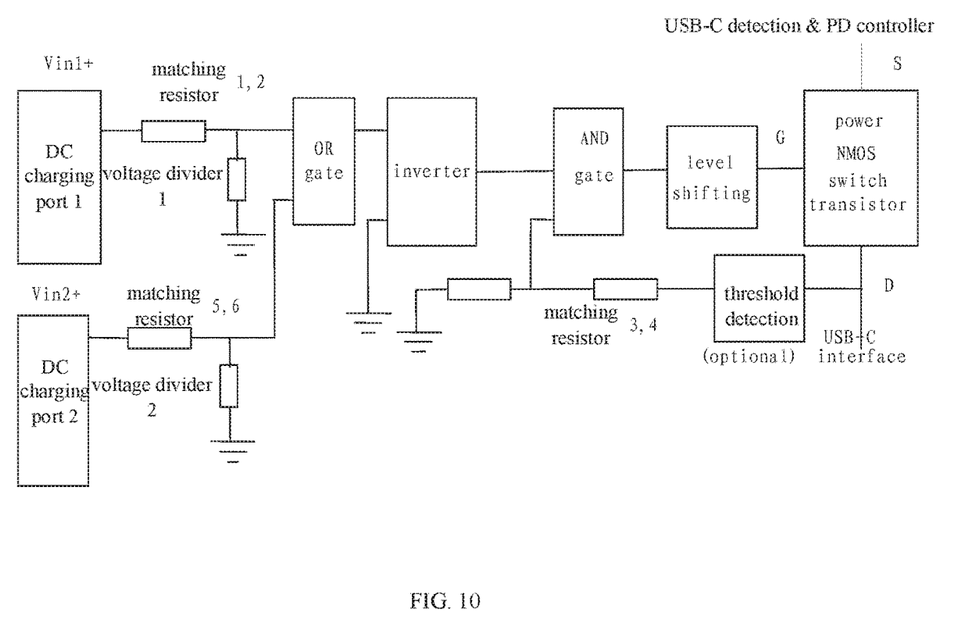
FIG. 10 is a structural diagram of an electronic apparatus of an embodiment of the present disclosure.

The symbol ④ indicates that the power supply potential information of the USB-C 2 interface and the power supply potential information of the USB-C 1 interface are transmitted to an OR gate (the OR gate simply demonstrates that this logic relation is placed at the preceding stage of the power switch control circuit; its ideal position is at the latter stage of the voltage divider of the DC charging port as shown in FIG. 10, that is to say, the signals of the two USB-C charging ports are transmitted to the common OR gate via the threshold detection and voltage divider circuits, respectively, and reach the common inverter and subsequent circuits after the OR logic), and then reach the power switch control circuit; ultimately, in a case that any USB-C interface has an external 20V/5A adapter, the power switch of the DC charging port can be turned off, achieving charging by the USB-C interface (if both the USB-C interfaces are enabled, they are equivalent to parallel inputs, and each interface provides only half of the total charging current). Such an OR gate cannot achieve reverse shutoff control of the charging for the two USB-C interfaces by the DC charging port. Achieving reverse shutoff does not need an OR gate; it just needs that the gate electrodes of NMOS power transistors connected respectively to two USB-C interfaces are controlled simultaneously at the right side of the level shifting circuit shown in FIG. 3.

The symbol ⑤ indicates that the USB-C detection & PD controller associated with the USB-C 2 interface is connected to the charging management module to supply power to the system.

The symbol ⑥ indicates that the audio signal of the USB-C 2 interface is transmitted to the audio codec to achieve the audio input/output.

The symbol ⑦ indicates that the signals of the USB-C 2 interface is transmitted to the high-speed data crossbar switch array to separate the USB protocol data, and the USB protocol data is transmitted to the main processor along with the USB data from the USB HUB 2, achieving the protocol data communication between the USB-C 2 interface and the main processor.

The preferred embodiments of the present disclosure have been described above with reference to the accompanying drawings, and are not intended to limit the scope of the present disclosure. A person skilled in the art can implement the disclosure in various variants without departing from the scope and essence of the disclosure. For example, a feature of one embodiment can be used in another embodiment to obtain a further embodiment. Any modifications, equivalent substitutions and improvements made within the technical concept of the present disclosure are intended to be within the scope of the present disclosure.

INDUSTRIAL APPLICABILITY

The foregoing technical solutions provided by the embodiments of the present disclosure have both a data and charging port and a DC charging port, and the data and charging port and the DC charging port are detected; when it is detected that at least one of the data and charging port and the DC charging port is transferring electrical energy, one of the ports which is transferring the electrical energy is selected to be electrically connected to a charging management module so that the charging management module acquires the electrical energy and charges the battery; furthermore, the electronic apparatus according to the embodiment of the present disclosure detects the data transmitted by the data and charging port and/or the data interface so that the electronic apparatus acquires, as long as either of them performs video data transmission, the video data for processing regardless of whether the data and charging port is serving to charge.

What is claimed is:

1. An electronic apparatus with a battery built therein, wherein the electronic apparatus comprises: a data and charging port, a direct current charging port, a data interface, a power switch, a charging management module, a main processor, a video receiver, and a video processing module;
the data and charging port is configured to transfer electric energy or transmit video data;
the direct current charging port is configured to transfer electric energy;
the data interface is configured to transmit video data;
the power switch is configured to detect whether the data and charging port or the direct current charging port is transferring electric energy, and enable a conduction between the data and charging port or the direct current charging port and the charging management module according to a detection result, the charging management module, after the charging management module becomes in conduction with the data and charging port or the direct current charging port, employs the data and charging port or the direct current charging port to charge the battery; and
the main processor is configured to control the video receiver to detect whether the data and charging port or the data interface is transmitting video data, receive the video data from either of them according to a detection result, and send the received video data to the video processing module for processing;
wherein the power switch comprises a threshold detection circuit, an inverter, a comparator, and a switch transistor;
the threshold detection circuit is configured to detect a potential of the data and charging port;

the inverter is configured to acquire the potential of the data and charging port or a potential of the direct current charging port, and input a corresponding reverse potential;

the comparator is configured to compare the reverse potential of the data and charging port and the potential of the direct current charging port, or compare the potential of the data and charging port and the reverse potential of the direct current charging port, and a potential of a comparison result controls the switch transistor to turn on or off;

the switch transistor turning on or off causes a connection or disconnection between the data and charging port or the direct current charging port and the charging management module.

2. The electronic apparatus of claim 1, wherein the data and charging port and the data interface are further configured to transmit interface protocol data; the main processor is configured to process the interface protocol data transmitted by the data and charging port and by the data interface.

3. The electronic apparatus of claim 2, further comprising: an interface controller, and a high-speed data crossbar switch array;

the interface controller is configured to control the high-speed data crossbar switch array to perform a detection on the data and charging port; when it is detected that the data and charging port transmits the interface protocol data, the interface protocol data is transmitted to the main processor; and when it is detected that the data and charging port transmits the video data, the video data is transmitted to the video receiver.

4. The electronic apparatus of claim 3, wherein, the data and charging port acquires electric energy by a configuration channel signal pin, a power line is provided between the interface controller and the data and charging port, and the interface controller acquires the electric energy transferred by the configuration channel signal pin through the power line and transfers it to the charging management module.

5. The electronic apparatus of claim 1, wherein the electronic apparatus further comprises a first converter chip, and a second converter chip;

the video receiver is configured to receive high-definition multimedia interface video;

video data received by the data and charging port is video-interface video, and the first converter chip converts the video-interface video into the high-definition multimedia interface video and then transmits it to the video receiver;

video data received by the data interface is mobile high-definition link video, and the second converter chip converts the mobile high-definition link video into the high-definition multimedia interface video and then transmits it to the video receiver.

6. The electronic apparatus of claim 1, wherein, there are more than one data interface.

7. The electronic apparatus of claim 1, wherein, the video processing module is an optical projection module.

\* \* \* \* \*